March 4, 1958 P. H. DANLY ET AL 2,825,560
GRIP FEED
Filed Aug. 19, 1955 10 Sheets-Sheet 9
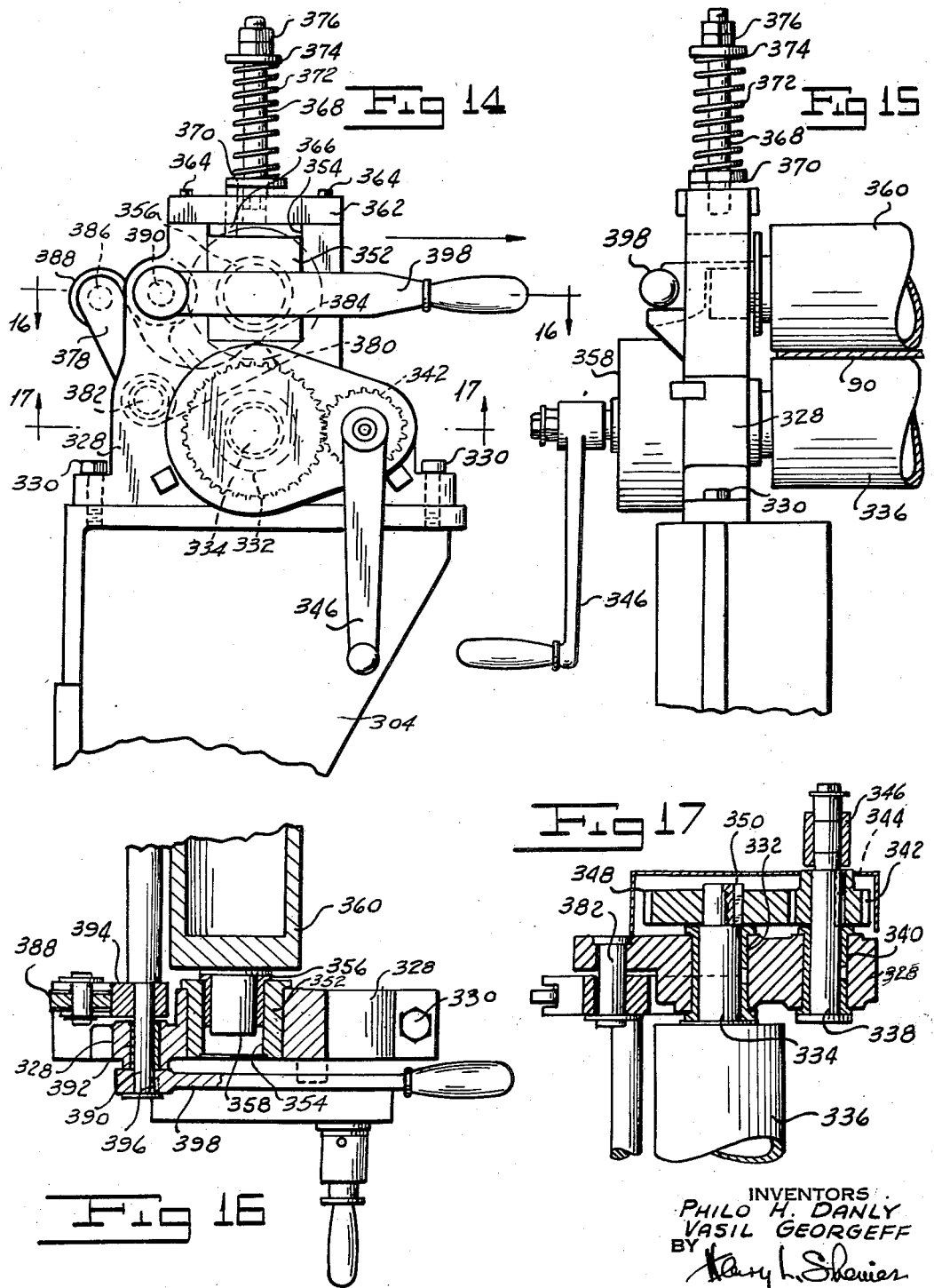
INVENTORS
PHILO H. DANLY
VASIL GEORGEFF
BY
ATTORNEY March 4, 1958

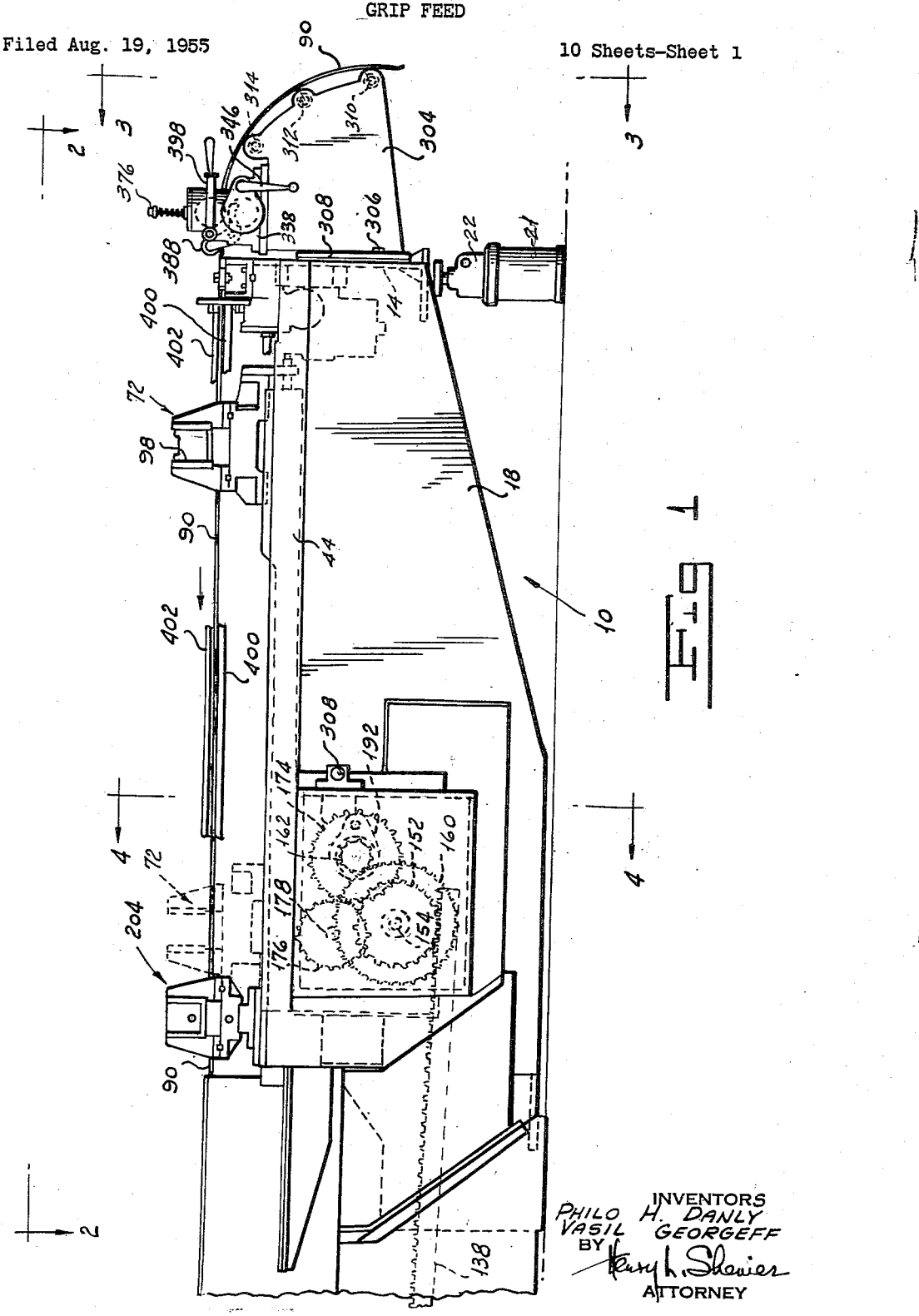

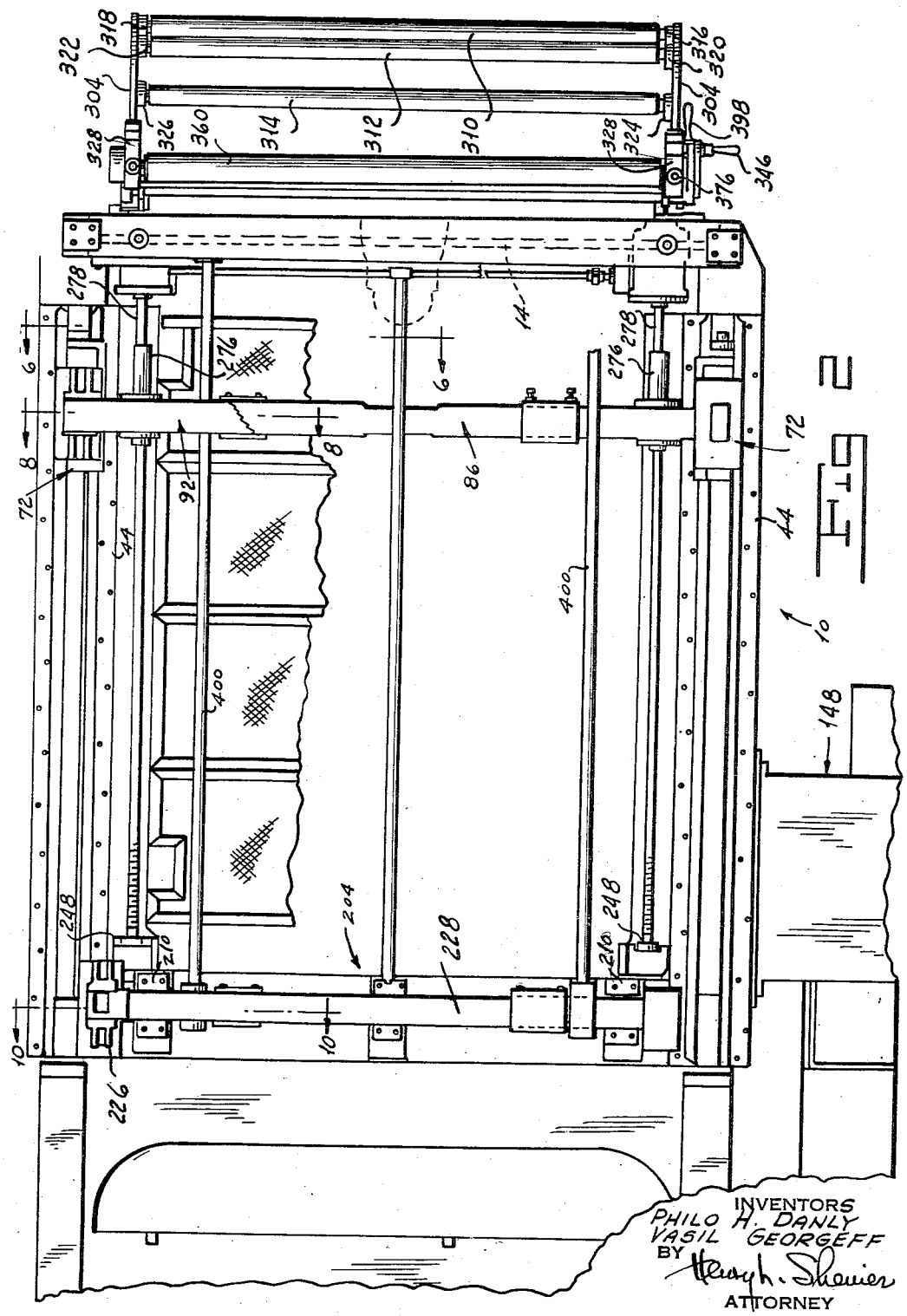

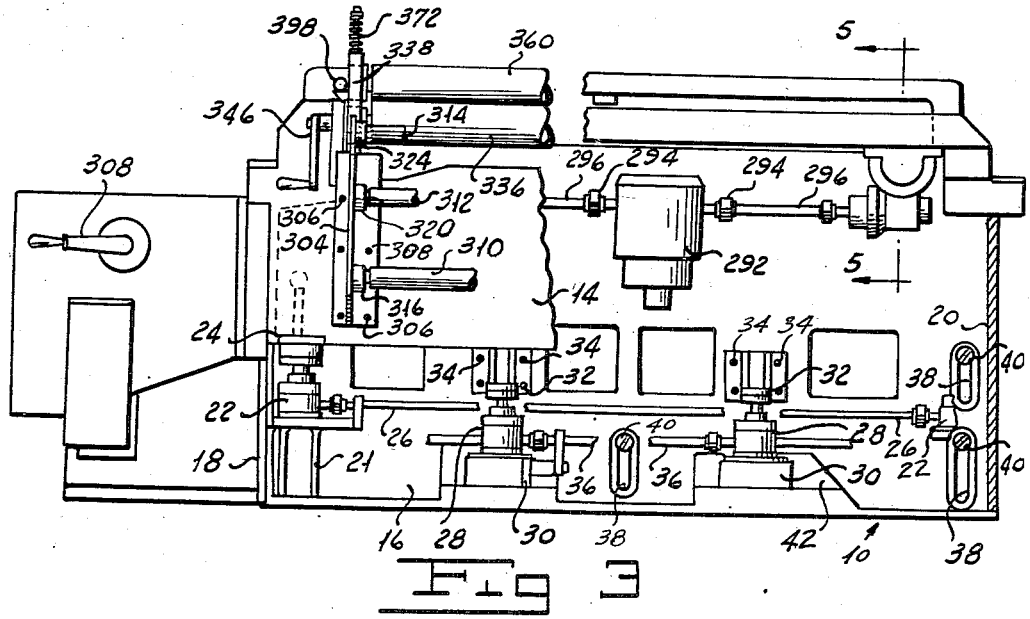
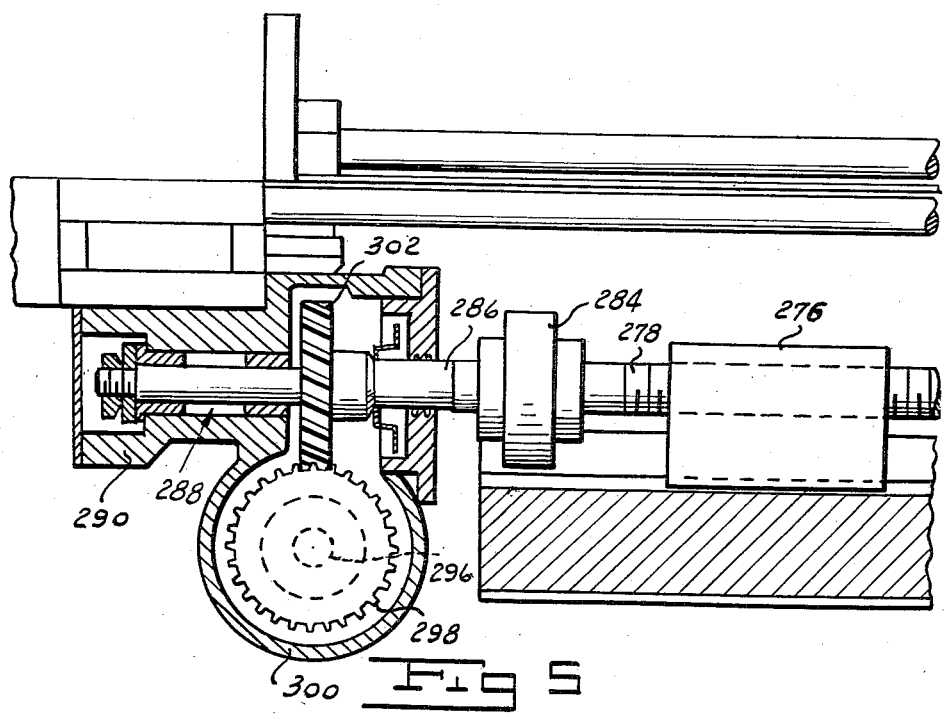

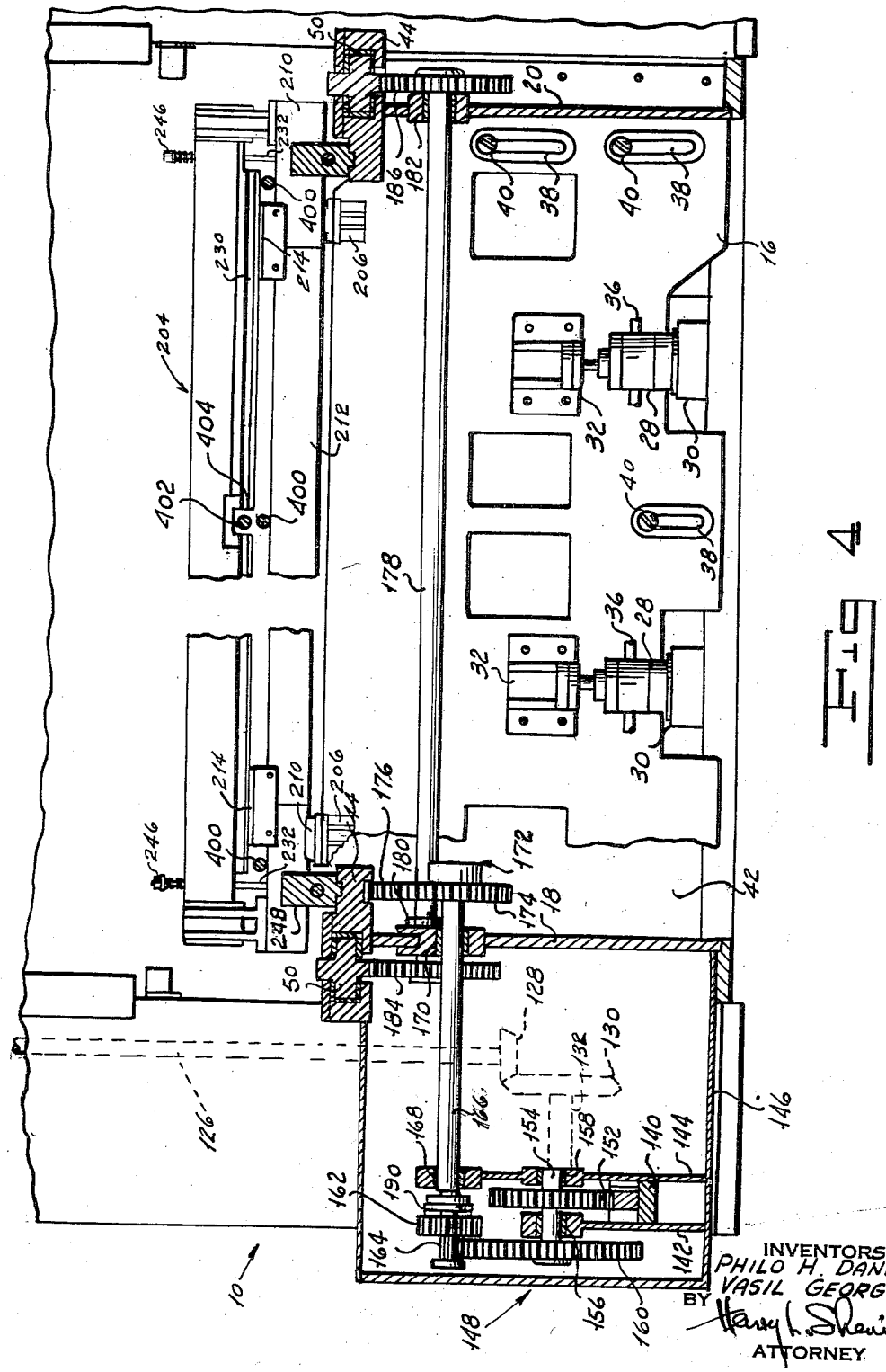

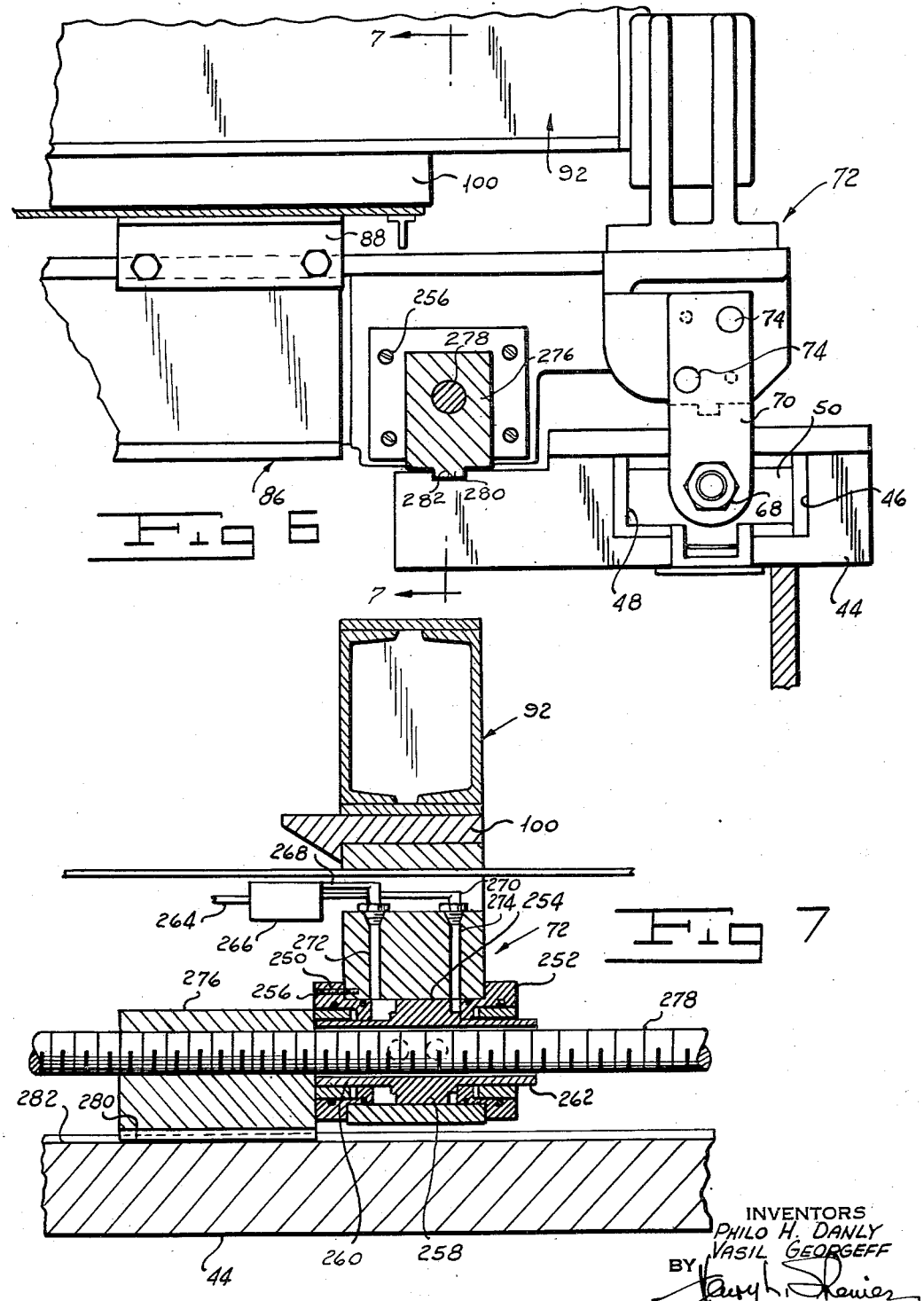

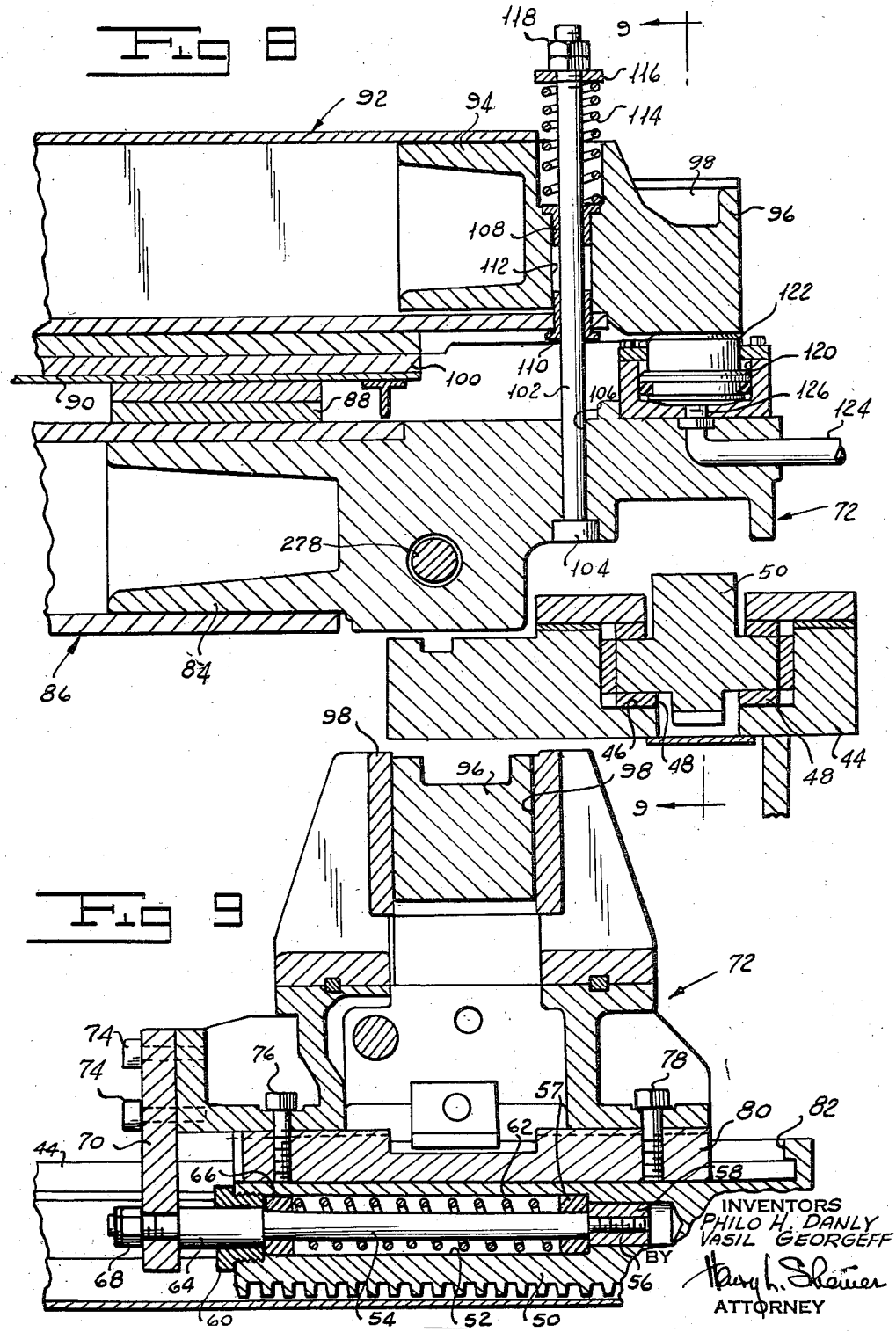

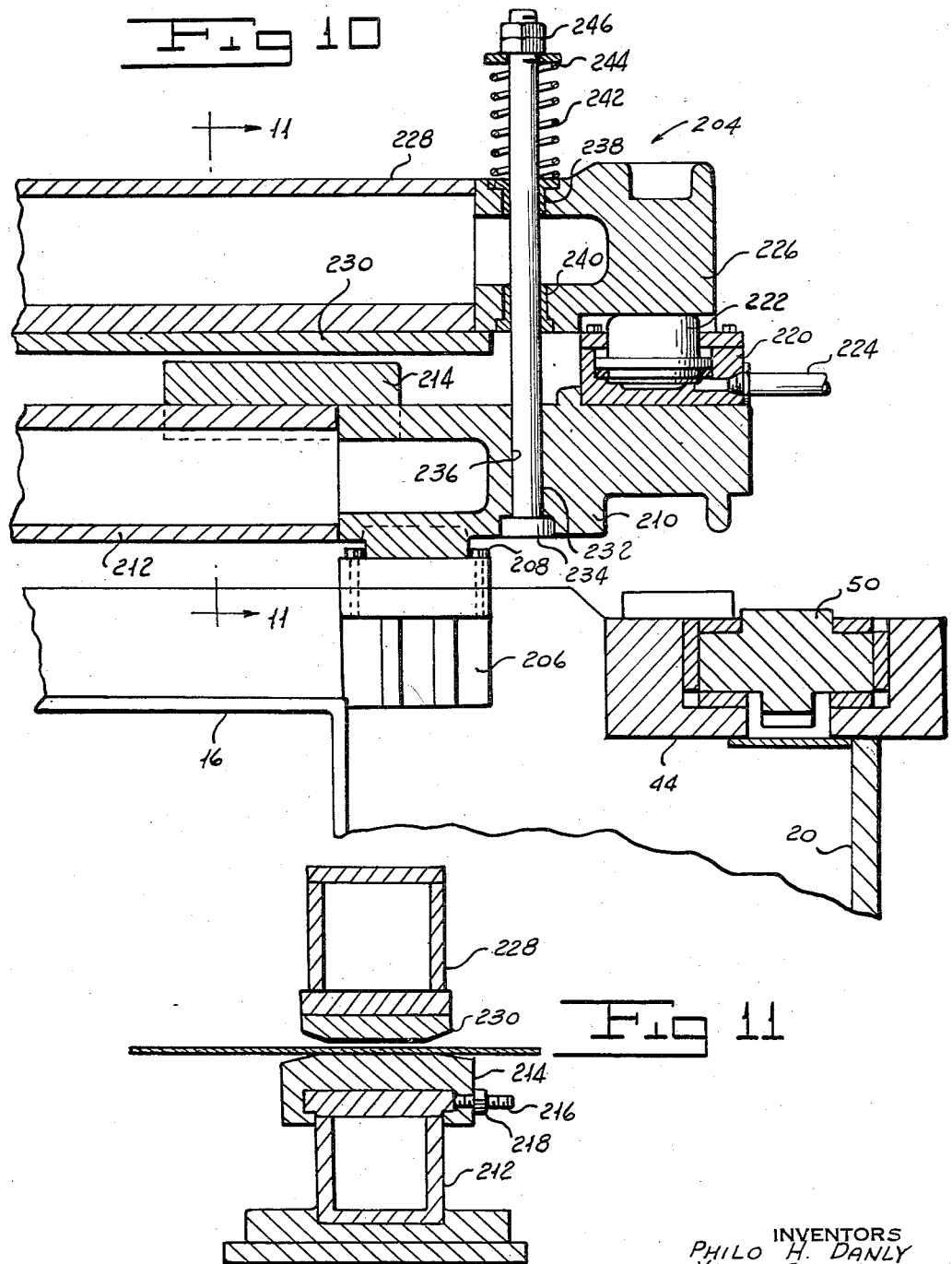

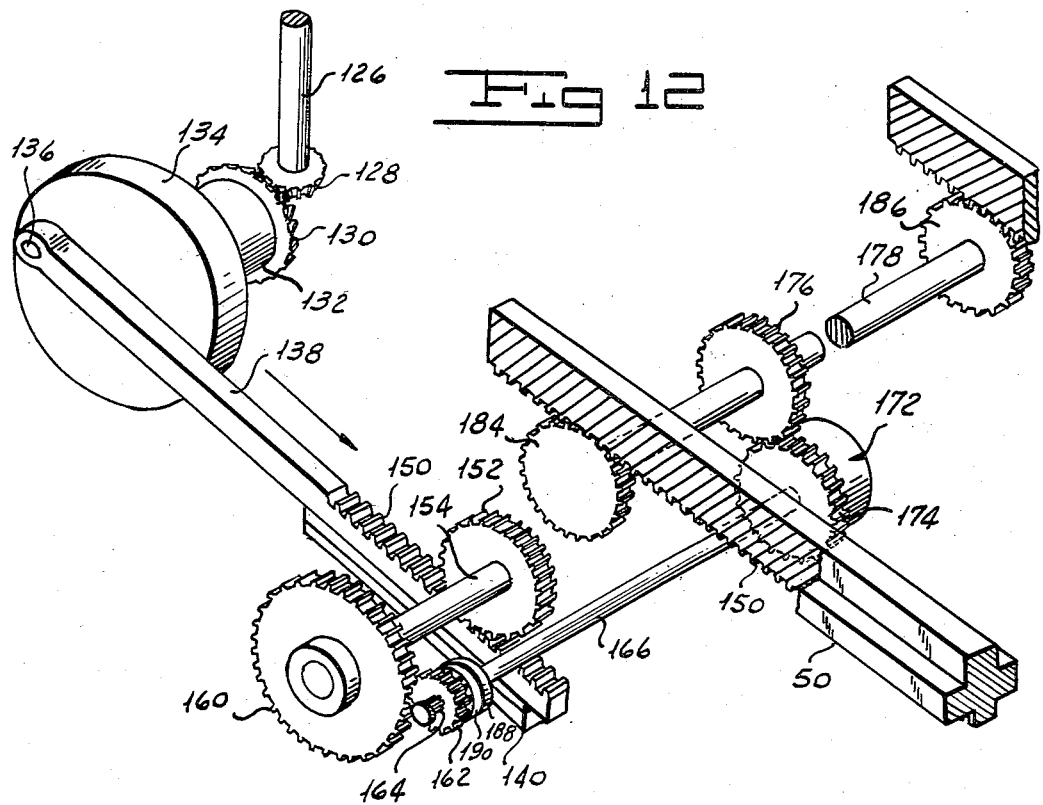
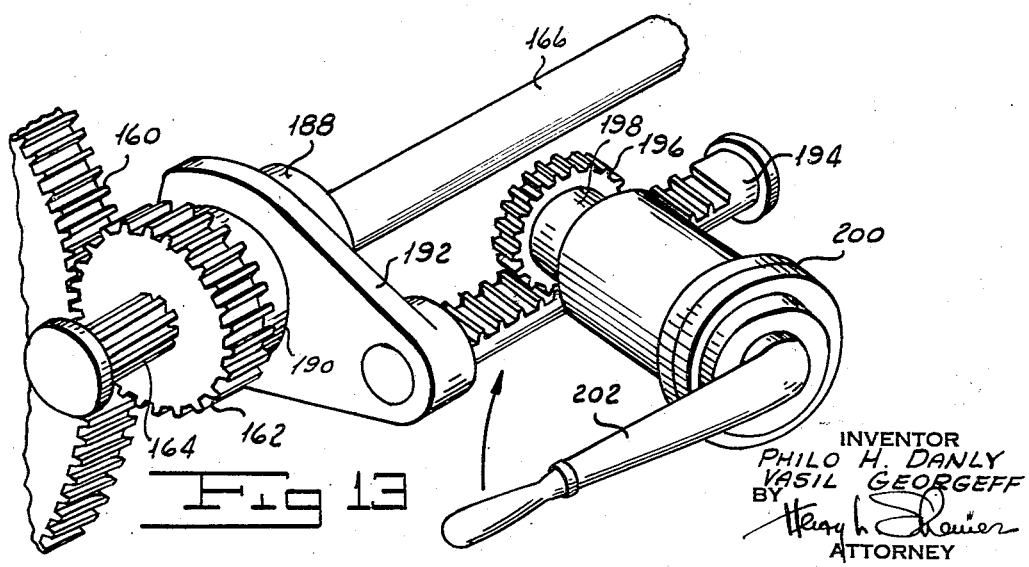

P. H. DANLY ET AL 2,825,560

GRIP FEED

Filed Aug. 19, 1955

INVENTORS
PHILO H. DANLY
VASIL GEORGEFF
BY
ATTORNEY

United States Patent Office 2,825,560
Patented Mar. 4, 1958

2,825,560

GRIP FEED

Philo H. Danly, Hinsdale, and Vasil Georgeff, La Grange Park, Ill., assignors to Danly Machine Specialties, Inc., Chicago, Ill., a corporation of Illinois Application August 19, 1955, Serial No. 529,518

22 Claims. (Cl. 271—2.5)

Our invention relates to a grip feed and more particularly to a grip feed for feeding continuous sheet material to a machine, such as a power press, in predetermined lengths in phased relation with the press operation.

Power presses used in the manufacture of automobile parts and in the manufacture of other heavy goods are large and expensive pieces of machinery. It is desirable that a high production rate be achieved with a power press in order that the capital investment represented by the press may be recovered in as short a period of time as is possible in profit from the manufactured product. There are presently available high speed power presses which are capable of performing a large number of operations in a predetermined short period of time. In certain types of press operations, such as, for example, as the formation of automobile body parts, lengths of sheet material, such as steel, are fed to the press which forms the lengths into the desired part. These sheets of material cannot manually be fed to the power press fast enough to permit it to operate at is maximum capacity. Further, owing to the high cost of labor, manual feeding of the sheets to the press greatly increases the cost of the finished part. For these reasons it is desirable that a continuous sheet of material be fed in predetermined lengths to the press, which may, in addition to performing its forming operation, cut the sheet into the predetermined lengths. Such a feed permits a high rate of production since the press may perform very nearly its maximum number of operations per unit period of time. Further, labor costs are substantially reduced with the result that the finished product is less expensive.

We have invented a grip feed for feeding a continuous sheet of material in predetermined lengths to a machine, such as a power press or the like, which is to perform operations on the sheet material. Our feed enables us to take advantage of the large number of operations per unit period of time which can be performed on modern high speed presses. It eliminates much manual handling with the result that it materially reduces the cost of producing parts.

One object of our invention is to provide a grip feed for feeding sheet material to a machine, such as a power press, in predetermined lengths in phased relation with the press operations.

Another object of our invention is to provide a grip feed which permits a power press or the like with which it is used to operate at very nearly its maximum number of operations per unit period of time.

A further object of our invention is to provide a grip feed which materially reduces the labor costs involved in the manufacture of parts on a machine such as a power press or the like.

Other and further objects of our invention will appear from the following description.

In general, our invention contemplates the provision of an improved grip feed for feeding continuous sheet material to a power press or the like in predetermined lengths including a frame disposed adjacent the press to be fed and feed means mounted for reciprocation on the frame. Drive means operated by the press drive reciprocates the feed means on the frame. We provide the feed means with means to be actuated to grip the material being fed. At the beginning of a feeding stroke, the press control actuates the gripping means to grip the material which is advanced as the feed means makes its feed stroke. At the end of the feed stroke, the gripping means is actuated to release the material. We provide our grip feed with means responsive to the press operation for clamping the sheet material in position at the end of the feed stroke. This clamping means is released at the beginning of the next feed stroke. We provide our grip feed with manually operated means for advancing the continuous sheet of material to the feed means to initiate operation of our grip feed.

In the accompanying drawings which form part of the instant specification and which are to be read in conjunction therewith and in which like reference numerals are used to indicate like parts in the various views;

Figure 1 is a side elevation of our grip feed assembly.

Figure 2 is a top plan view taken along the line 2—2 of Figure 1 of our grip feed.

Figure 3 is a front elevation taken along the line 3—3 of Figure 1 of our grip feed with some parts broken away and other parts shown in section.

Figure 4 is a sectional view taken along the line 4—4 of Figure 1 of our grip feed with parts broken away, drawn on an enlarged scale.

Figure 5 is a sectional view drawn on an enlarged scale and taken along the line 5—5 of Figure 3 of our grip feed.

Figure 6 is a fragmentary sectional view drawn on an enlarged scale and taken along the line 6—6 of Figure 2 of our grip feed.

Figure 7 is a fragmentary sectional view taken along the line 7—7 of Figure 6 of our grip feed.

Figure 8 is a sectional view drawn on an enlarged scale and taken along the line 8—8 of Figure 2 of our grip feed.

Figure 9 is a sectional view taken along the line 9—9 of Figure 8 of our grip feed.

Figure 10 is a sectional view drawn on an enlarged scale taken along the line 10—10 of Figure 2 of our grip feed.

Figure 11 is a sectional view taken along the line 11—11 of Figure 10 of our grip feed with parts removed.

Figure 12 is a perspective view of the drive means of our grip feed with some parts removed and other parts broken away.

Figure 13 is a fragmentary perspective view of the drive gear cutout means of our grip feed with some parts removed and other parts broken away.

Figure 14 is a fragmentary side elevation of the manually operated feed-in rolls of our grip feed.

Figure 15 is a fragmentary front elevation of the manually operated feed-in rolls of our grip feed.

Figure 16 is a fragmentary sectional view taken along the line 16—16 of Figure 14 of the manually operated feed-in rolls of our grip feed.

Figure 17 is a fragmentary sectional view taken along the line 17—17 of Figure 14 of the manually operated feed-in rolls of our grip feed.

Figure 18:
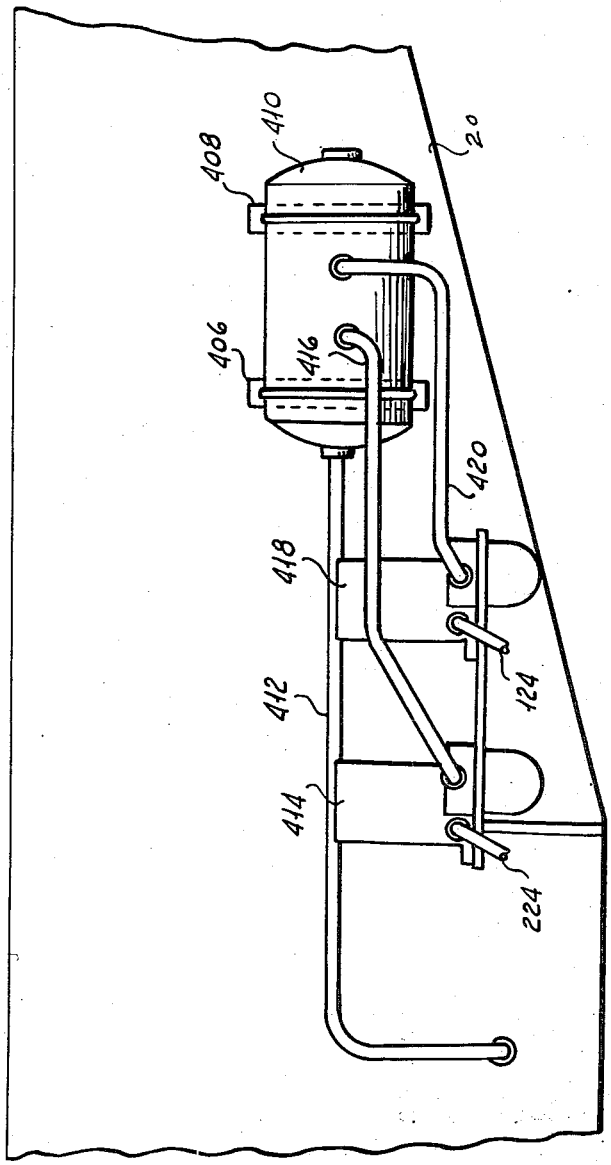
Figure 18 is a side elevation of the fluid pressure operating system for our grip feed.

More particularly referring now to Figures 1 to 4 of the drawings, our grip feed includes a frame, indicated generally by the reference character 10, formed by a front plate 14, a rear plate 16 and a pair of side plates 18 and 20 joined to each other by any convenient means, such as bolts, welding or the like. As can be seen by reference to Figures 1 and 3, a pair of standards 21, each one of which is disposed adjacent a respective side of the frame 10, carry adjustable jacks 22 which support brackets 24 fixed to the front plate 14 by means such as welding or the like. Jacks 22 include drive shafts 26 which may be driven by any convenient means known to the art to operate the jacks to raise the front plate 14 of our grip feed.

A pair of rear plate support jacks 28 carried by standards 30 disposed inboard of standards 21 adjacent rear plate 16 support brackets 32 fixed to the rear plate 16 by means such as bolts 34. Jacks 28 include shafts 36 which may be driven in any known manner to raise the rear support plate 16. From the structure thus far described, it will be seen that jacks 22 and 28 provide a means for adjusting the height of the frame 10 with respect to floor level and of leveling the frame. In order to secure frame 10 in the position to which it has been raised by jacks 22 and 28, we form rear plate 16 with a number of slots 38 for receiving bolts 40 by means of which the rear plate 16 may be secured to an upright 42 carried by the floor on which the feed is supported.

Referring now to Figures 2, 4 and 6 to 8, each of the respective side plates 18 and 20, together with the front and rear plates 14 and 16, support a frame member 44 forming a guideway 46 in which we dispose ways 48 for supporting a rack 50 for sliding movement back and forth along the frame 10. As can best be seen by reference to Figure 9, we form one end of each of the racks 50 with a counterbore 52 in which we mount a rod 54, a threaded end 56 of which carries a head 58. Bored nuts 60 threaded into the ends of counterbores 52 mount the respective rods 54 for sliding movement within counterbores 52. A respective coil spring 62 surrounds each of the rods 54 and bears between a collar 66 adjacent nut 60 and a collar 57 adjacent head 58 carried by the rod 54. Each pair of collars 57 and 66 is slidably mounted on the shank of a respective rod 54. It will be seen that each spring 62 normally urges its associated rod 54 to the right with respect to rack 50 as viewed in Figure 9. The engagement of a collar 57 with the end of the associated bore 52 limits the movement of the corresponding rod 54 to the right under the influence of spring 62. Nuts 68 secure respective arms 70 carried by means of bolts 74 on lower feed bar support members, indicated generally by the reference character 72, to enlarged ends 64 of rods 54. Bolts 76 and 78 fasten carriers 72 to respective slides 80 mounted in ways 82 formed in racks 50. It will be seen that the feed bar support members 72 disposed adjacent the respective side plates 18 and 20 of the feed are mounted for limited movement with respect to the respective racks 50. The enlarged portions 64 on rods 54 engage collars 66 and move the collars to the right against the action of springs 62 when carriers 72 move to the right with respect to racks 50.

Referring now to Figures 8 and 9, each of the carriers 72 is formed with a support 84. Supports 84 carry between them the lower feed bar, indicated generally by the reference character 86, of our grip feed. Bar 86 carries adjacent each of its ends a gripper 88 for gripping the material 90, such as sheet steel or the like, being fed to the press with which our feed is used.

We mount an upper feed bar, indicated generally by the reference character 92, of our grip feed between supports 94 formed on carriers 96 disposed adjacent respective side plates 18 and 20. We form each of the lower feed bar carriers 72 with vertical ways 98 in which we mount the upper feed bar carriers 96. A gripper 100 extending substantially across the width of bar 92 and supported on the bar by any convenient means cooperates with grippers 88 to grip the material 90 when the bars 86 and 92 are clamped in a manner to be described.

We disposed respective vertically extending rods 102 formed with heads 104 in counterbored holes 106 in carriers 72. Pairs of bushings 108 and 110 carried in bores 112 in the respective carriers 96 slidably mount carriers 96 on rods 102. Springs 114 surrounding the shanks of rods 102 bear between bushings 108 and washers 116 held on rods 102 by retaining nuts 118. It will be seen that springs 114 normally urge carriers 96 and carriers 72 toward each other to force grippers 88 and 100 together to clamp the material 90 being fed.

We provide means for releasing the clamping pressure of springs 114 at predetermined points in the cycle of operations of the press with which our grip feed is used. Referring again to Figure 8, we mount a respective fluid pressure cylinder 120 on each of the carriers 72. Each carrier 96 normally rests on the piston 122 slidably mounted within the cylinder 120 mounted on the corresponding carrier 72. We connect a fluid pressure feed pipe 124 to an opening 126 in the base of cylinder 120. When fluid under pressure is admitted to cylinder 120 by pipe 124, piston 122 moves upwardly to drive the associated carrier 96 upwardly against the action of the corresponding spring 114. The simultaneous admission of fluid under pressure to both cylinders 120 raises both carriers 96 to move the upper feed bar 92 upwardly as viewed in Figure 8 against the action of springs 114 to relieve the clamping pressure of grippers 88 and 100 on the material 90 being fed. We provide means to be described hereinafter for admitting fluid under pressure to pipes 124 in timed relation with press operations to relieve the feed bar clamping pressure on the material 90 being fed.

We provide means for reciprocating rack 50 to drive the feed bar assembly including the upper and lower feed bars 92 and 86 back and forth along the frame 10. As can be seen by reference to Figures 4, 12 and 13, a shaft 126 driven by the flywheel (not shown) of the power press with which our grip feed is used carries for rotation with it a bevel gear 128 which engages and drives a bevel gear 130 fixed on the hub 132 of a crank disk 134 for rotation with it. Disk 134 carries a crank pin 136 to which we pivotally connect a drive link 138 slidably mounted on a member 140 supported by brackets 142 and 144 carried by the base 146 of a housing, indicated generally by the reference character 148, fixed by any convenient means to support plate 18. Member 140 permits the necessary rocking movement of drive link 138 as crank disk 134 rotates. Teeth 150 formed on link 138 drive a gear 152 fixed on a shaft 154 for rotation with it. Bushings 156 and 158 carried by the respective brackets 142 and 144 rotatably support shaft 154 on the frame 10. A gear 160 carried by shaft 154 for rotation with it normally engages a gear 162 carried by a splined portion 164 of a shaft 166 rotatably supported on frame 10 by bushings 168 and 170 carried respectively by bracket 144 and by plate 18. Shaft 166 carries for rotation with it the driving member of an overload slip clutch, indicated generally by the reference character 172. The driven member of clutch 172 carries a gear 174 for rotation with it. When gear 160 drives gear 162 to rotate shaft 166, clutch 172 drives gear 174 with a predetermined driving force. Gear 174 engages and drives a gear 176 fixed on a shaft 178 for rotation with it. Respective bearings 180 and 182 carried in side plates 18 and 20 rotatably support shaft 178 on frame 10. Shaft 178 carries for rotation with it respective gears 184 and 186 which drive the respective racks 50 supported on side plates 18 and 20.

It will be seen that as disk 134 rotates, link 138 reciprocates to oscillate gear 152. When gear 160 is in engagement with gear 162, clutch 172 oscillates gear 174 with a predetermined driving force. It will be noted we employ a step-up gear ratio so that a small throw of crank pin 136 will reciprocate racks 50 through the required large amplitude of reciprocating motion. This oscillation of gear 174 reciprocates racks 50 and the feed bar assembly carried thereby through the medium of gear 176, shaft 178 and gears 184 and 186.

We provide manually operable means for disengaging gear 162 from gear 160 to interrupt the feed bar drive when desired. As can best be seen by reference to Figures 4, 12 and 13, we form gear 162 with a hub 188 formed with an annular recess 190 engaged by an operating arm 192 carried by a rack 194 for movement with it. We slidably mount rack 194 in housing 148 by any convenient means (not shown) and mount a pinion 196 on a shaft 198 for rotation with it. A bearing 200 carried by housing 148 rotatably carries shaft 198 in the housing. A crank 202 fixed on shaft 198 for rotation with it provides a means for rotating pinion 196 to drive rack 194 to move member 192 to drive gear 162 along the splined portion 164 of shaft 166 to disengage gear 162 from gear 160. Rotation of crank 202 in a clockwise direction as viewed in Figure 13 shifts gear 162 to the left as viewed in the figure to disengage it from gear 160 and interrupt the feed bar drive.

The direction of feed of the sheet material is from right to left as viewed in Figure 1. When the feed bar assembly moves from its extreme right-hand position, indicated in solid lines, pipe 124 is out of communication with the fluid pressure source to be described hereinafter to permit springs 114 to clamp the material 90 between grips 88 and 100. When the feed bar assembly arrives at its extreme left-hand position, indicated in broken lines in Figure 1, we provide means to be described hereinafter for connecting pipe 124 to a source of fluid under pressure to operate pistons 122 to relieve the pressure of springs 114 urging bars 86 and 92 toward each other to release the material being fed.

Referring now to Figures 1, 4, 10 and 11, we provide a clamping bar assembly, indicated generally by the reference character 204, for gripping the material being fed during the period of time when the feed bar assembly moves from its extreme left-hand position as viewed in Figure 1 to its right-hand or full-line position. It is to be understood that during this period of time fluid under pressure is continuously supplied to pipe 124 to cause the release of the material from the feed bars 86 and 92. As can best be seen by reference to Figure 10, rear plate 16 carries by any convenient means, such as welding or the like, adjacent the respective members 44, brackets 206 to which we secure by means, such as bolts 208, the lower clamping bar and support members 210. Members 210 support between them by means such as welding the lower clamping bar 212 of our grip feed. We adjustably mount a pair of grips 214 along the length of bar 212 and fix them in position by set studs 216 held in position by nuts 218.

Each of the end supports 210 carries a fluid pressure cylinder 220 within which we mount a piston 222. Pipes 224 are adapted to supply fluid under pressure to cylinders 220 below pistons 222 to drive the pistons upwardly as viewed in Figure 10. A pair of upper clamping bar and supports 226 normally rest on pistons 222. Supports 226 carry between them by means such as welding the upper clamping bar 228 to which we fix by any convenient means a grip 230 for cooperation with grips 214. We mount a pair of rods 232 formed with heads 234 in counterbored holes 236 formed in the respective supports 210. Pairs of bushings 238 and 240 carried by the supports 226 slidably carry the supports on rods 232. Each one of a pair of springs 242 bears between bushing 238 and a washer 244 held on a rod 232 by retaining nuts 246 to urge bars 212 and 228 toward each other normally to clamp the material being fed between grips 214 and 230. Piston 222 provides a means for moving supports 226 and a bar 228 upwardly as viewed in Figure 10 to unclamp the material being fed when fluid under pressure is supplied to pipe 24. As will be explained hereinafter, when the feed bar assembly moves from right to left as viewed in Figure 1, fluid under pressure is supplied continuously to pipe 224 to release grips 214 and 230 to permit the material being fed to pass between bars 212 and 228. In the course of this movement pipes 124 are not in communication with the source of fluid under pressure. When the feed bar assembly arrives at its extreme left-hand position as viewed in Figure 1, the pressure on pipes 224 is relieved to permit bars 212 and 228 to clamp the material being fed. At the same time fluid under pressure is supplied to pipes 124 to release the material being fed from bars 86 and 92 to permit the feed bar assembly to return to its right-hand position as viewed in Figure 1.

We provide stops for limiting the movement of the feed bar assembly in both directions of its movement. As can best be seen by reference to Figures 2 and 4, each support 210 carries a fixed stop 248. Referring now to Figure 7, we secure a pair of annular cylinder-forming members 250 and 252 to each of the carriers 72 at the ends of a bore 254 formed in the carrier 72. This may conveniently be accomplished by means such as screws 256. Members 250 and 252 together with bore 254 form a dashpot cylinder in which we slidably mount a bored piston 258. Each piston 258 includes a pair of cylindrical extensions 260 and 262 extending outwardly through the annular members 250 and 252. A pipe 264 connected to a source of fluid, such as oil, under pressure supplies fluid to a reservoir 266 connected by respective pipes 268 and 270 to bores 272 and 274 leading to bore 254 on the respective sides of piston 258. The length of extension 262 of piston 258 is such that when the feed bar assembly arrives at the extreme left-hand position as viewed in Figure 1 the extension 262 engages a stop 248. Stop 248 arrests the movement of piston 258 and the feed bar assembly continues to move against the oil pressure within the bore 254 until it stops. It is to be understood that the drive for racks 50 is at this time in the neighborhood of one of its reversal points. If the feed bar assembly is stopped before the rack drive reaches the reversal point, slip clutch 172 permits relative motion between the rack drive and the racks until reversal takes place.

Movement of the feed bar assembly from left to right as viewed in Figure 1 is limited by adjustable stops 276 carried by worms 278. Referring now to Figures 2 and 4 to 7, we form stops 276 with keys 280 which ride in keyways 282 formed in members 44 to prevent rotation of stops 276 with worm 278 when the worm is driven in a manner to be described. Referring now more particularly to Figure 5, flexible couplings 284 connect worms 278 to shafts 286 rotatably mounted in bearings, indicated generally by the reference character 288, carried by brackets 290 supported on frame 10. As can be seen by reference to Figures 3 and 5, a motor 292 connected by respective flexible couplings 294 to shafts 296 drives a pair of gears 298 in housings 300. Gears 298 mesh with gears 302 carried by shafts 286 for rotation with the shafts. When motor 292 is energized, it drives gears 298 to drive worms 278 to move stops 276 to the proper position on frame 10 to arrest the feed bar assembly at the proper point in its movement to the right as viewed in Figure 1. When, during the course of its movement to the right as viewed in Figure 1, the feed bar assembly approaches stops 276, extensions 260 on piston 258 engage the stops and the feed bar assembly continues to move against the action of the fluid in bore 254 until the feed bar assembly stops.

Referring now to Figures 1 to 3, we secure a pair of spaced bearing support plates 304 to the front plate 14 by means such as bolts 306 passing through flanges 308 carried by the plates. Plates 304 support between them a plurality of sheet material supporting rollers 310, 312 and 314 mounted in respective pairs of bearings 316 and 318, 320 and 322, and 324 and 326 carried by plates 304. In passing into our grip feeder the material being fed passes over rollers 310, 312 and 314 in succession in the direction indicated by the arrows in Figure 1.

As can be seen by reference to Figures 1 to 3 and 14 to 17, we provide releasable manually operable means for initiating the feeding of stock, such as sheet material, to the feed bar assembly of our grip feed. Each of the bearing support plates 304 has a bracket 328 secured to it by means of bolts 330. Brackets 328 carry respective bushings 332 which support the shaft ends 334 of a bottom feed-in roll 336. A stub shaft 338 rotatably carried in a bushing 340 in one of the brackets 328 has a gear 342 secured on it by a key 344. A crank handle 346 fixed on shaft 338 for rotation with it provides a means for rotating shaft 338 to rotate gear 342. Gear 342 meshes with and drives a gear 348 fixed by a key 350 on one of the shaft ends 334 for rotation with it. It will be seen that operation of crank handle 346 rotates shaft 338 to drive bear 348 and feed-in roll 336. A pair of bearing blocks 352 mounted in ways 354 formed in brackets 328 above roll 336 carry bearings 356 which support the shaft ends 358 of a top feed-in roll 360. Members 362 secured to brackets 328 by bolts 364 retain blocks 352 in ways 354. Each of the blocks 352 carries an upright 366 extending through a suitable opening in member 362. We thread one end of each of a pair of studs 368 in one of the respective members 362. Bolts 368 pass upwardly through suitable openings in members 370, fixed by any convenient means such as welding to uprights 366. Springs 372 bearing between members 370 and washers 374 retained on bolts by nuts 376 force blocks 352 carrying the upper feed-in roll 360 downwardly as viewed in Figure 14 to force roll 360 against roll 336. It will be seen that actuation of crank handle 346 drives the feed-in rolls to draw the sheet material being fed into our grip feed toward the feed bar assembly.

We provide means for relieving the pressure of springs 372 to free the material being fed from the feed-in rolls 336 and 360 when automatic feed is in operation. Referring now to Figures 1 and 14 to 17, we pivotally mount respective bell cranks having arms 378 and 380 on stub shafts 382 fixed in brackets 328. We form arms 380 with cam surfaces 384 which normally engage the bases of blocks 352. The other arms 378 carry pins 386 which pivotally mount cam follower rollers 388. A pair of stub shafts 390 rotatably mounted in brackets 328 by bushings 392 carry for rotation with them adjacent each of the brackets 328 cams 394. As springs 372 force blocks 352 downwardly as viewed in Figure 14, blocks 352 act on arms 380 to urge the rollers 388 carried by arms 378 into engagement with cams 394. A key 396 fixes a crank handle 398 on shaft 390 for rotation with it. Actuation of crank handle 398 to rotate shaft 390 brings the high points of cams 394 into engagement with followers 388 to pivot the bell cranks including arm 378 and arm 380 in a counterclockwise direction as viewed in Figure 14 to raise blocks 352 against the action of springs 372 to release the material 90 being fed from feed-in rolls 336 and 360. This is the position of the parts shown in Figures 1 and 14 to 17.

As can be seen by reference to Figures 1, 2 and 4, advantageously we provide material support rods 400 adjustably supported by any convenient means between the front and rear support plates 14 and 16 of the machine. As can best be seen by reference to Figure 4, bars 400 are disposed under the grips 100 and 230 carried by the upper feed and clamp bars in the space on the lower feed and clamp bars which is not occupied by grips 88 or 214. We provide an additional bar 402 disposed in openings 404 in the upper feed and clamp bars and supported between plates 14 and 16 for preventing bowing of the sheet material during feeding.

Referring now to Figures 8, 10 and 18, side plate 20 carries brackets 406 and 408 which support a tank 410 supplied with fluid, such as compressed air or the like, maintained under pressure from a fluid pressure supply pipe 412. We connect one of the outlets of tank 410 to an inlet port of a simple on-off valve 414 of a type known in the art by a pipe 416. We connect the outlet port of valve 414 to pipe 224 which leads to the cylinders 220 associated with the clamping bar assembly. We connect a second outlet port of tank 410 to the inlet port of a second on-off valve 418 by a pipe 420. We connect the outlet port of valve 418 to pipe 124 which leads to the cylinders 120 associated with the feed bar assembly. Conveniently, valves 414 and 418 may be solenoid operated valves, the solenoid windings of which are energized in response to operation of a rotary press limit switch (not shown) in a manner known to the art. Such a limit switch is shown in our copending application Serial No. 365,107, filed June 30, 1953, now patent No. 2,753,405.

In operation of our grip feed, to start a feeding operation, we pass a sheet of material to be fed over rollers 310, 312 and 314 to feed-in rolls 336 and 360. We move crank arm 398 to position the low points of cams 394 to be engaged by followers 388 to permit springs 372 to clamp material between rolls 336 and 360. We then rotate crank 346 to drive feed-in rolls 336 and 360 to advance the sheet of material to the feed bar assembly including bars 86 and 92. After the material has been advanced manually the required distance into our grip feed by actuation of crank handle 346, we move handle 398 to pivot the bell crank including arms 378 and 380 in a counterclockwise direction as viewed in Figure 14 to move blocks 352 upwardly and release the material 90 being fed. Springs 114 urge bars 86 and 92 toward each other to grip the material being fed between grips 88 and 100. The press drive rotates crank disk 134 to oscillate gears 184 and 186 through clutch 172. As gears 184 and 186 oscillate, racks 50 reciprocate to drive the feed bar assembly back and forth along the frame 10. As the feed bar assembly moves from its extreme right-hand or full-line position shown in Figure 1, it carries the sheet material to the clamping bar assembly 204. During this period of time valve 414 connects pipe 224 to tank 40 to relieve the pressure of springs 242 which urge the upper and lower clamping bars 228 and 212 together. At the same time valve 418 is not operated so that no fluid under pressure is fed to pipe 124 with the result that springs 114 clamp the material being fed between grips 88 and 100.

As the feed bar assembly arrives at its extreme left-hand or broken-line position shown in Figure 1, extensions 262 on dashpot pistons 258 engage the fixed stops 248 carried by the frame rear plate to arrest the movement of the feed bar assembly. Advantageously, at this time the drive for the feed bar has reached one limit of its movement. If for any reason the drive still operates to urge the feed bar assembly to the left as viewed in Figure 1, clutch 172 slips to permit relative movement between the drive and the feed bar assembly.

When the direction of drive of the feed bar assembly reverses, the press limit switch causes timed operation of valves 414 and 418 to disconnect pipe 224 from the source of fluid under pressure and to connect valve 418 to the source of fluid under pressure. This action moves pistons 122 to release the material being fed from grips 88 and 100 and to clamp the material between the clamping bar grips 214 and 230 under the action of springs 242. Thus, as the feed bar assembly moves from left to right as viewed in Figure 1, the clamping bar grips retain the material being fed in position.

When the feed bar assembly arrives at its extreme right-hand or full-line position shown in Figure 1, extensions 260 engage the motor driven movable stops 276 to arrest the movement of the feed bar assembly. At this time the press limit switch energizes circuits to operate valves 414 and 418 to connect pipe 224 to a source of fluid under pressure and to disconnect pipe 124 from the source. This action clamps the material being fed between feed bar grips 88 and 100 and release the material from the grips 214 and 230. When the feed bar drive reverses the material is advanced to the left as viewed in Figure 1 to the machine with which the grip feed is used. Jacks 22 and 28 may be driven to raise or lower the level of frame 10 and the feed mechanism carried by the frame.

It will be seen that we have accomplished the objects of our invention. We have provided a grip feed for feeding a continuous sheet of material in predetermined lengths to a machine, such as a power press or the like, with which our feed is used in proper phase relation with the operation of the press. Our feed materially reduces stock handling in the manufacture of parts on a machine, such as a power press, to reduce the ultimate cost of the products produced. Our feed permits us to operate a power press at very nearly its maximum capacity to afford a high rate of production of parts.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A grip feed for feeding continuous sheet material in predetermined lengths including in combination a frame, clamping means carried by said frame, normally effective means for actuating said clamping means to grip a sheet of material, feeding means adapted when actuated to grip said sheet, means mounting said feeding means for reciprocation on the frame, normally effective means for actuating said feeding means to grip the material being fed, drive means for reciprocating said feed means with a feed stroke toward said clamping means and with a return stroke away from the clamping means, and a control means for rendering said clamping means actuating means ineffective during the said feed stroke and for rendering the feeding means actuating means ineffective during the return stroke.

2. A grip feed for feeding continuous sheet material in predetermined lengths including in combination a frame, a clamping bar assembly comprising an upper clamping bar and a lower clamping bar carried by the frame, means normally urging said upper clamping bar and said lower clamping bar toward each other to grip the sheet of material, a feed bar assembly comprising an upper feed bar and a lower feed bar carried by the frame, means normally urging said upper feed bar and said lower feed bar toward each other to clamp a sheet of material being fed, means mounting the feed bar assembly for reciprocation on the frame, drive means for reciprocating the feed bar assembly with a feed stroke toward the clamping bar assembly and with a return stroke away from the clamping bar assembly and means for rendering the clamping bar urging means ineffective during the feed stroke and for rendering the feed bar urging means ineffective during the return stroke.

3. A grip feed as in claim 2 in which the means for urging the upper clamping bar toward the lower clamping bar includes means providing a connection between the upper and lower clamping bars and a spring acting on said connecting means.

4. A grip feed as in claim 2 in which the means for urging the upper feed bar toward the lower feed bar includes means providing a connection between the upper and lower feed bars and a spring acting on said connecting means.

5. A grip feed as in claim 2 in which the means for urging the upper clamping bar toward the lower clamping bar includes a spring, said means for rendering the clamping bar urging means ineffective including a cylinder having a piston associated therewith, said piston being disposed to move said upper clamping bar away from the lower clamping bar against the action of said spring when fluid under pressure is supplied to said cylinder, and means for supplying fluid under pressure to said cylinder during said feed stroke.

6. A grip feed as in claim 2 in which the means for urging the upper feed bar toward the lower feed bar includes a spring, said means for rendering the feed bar urging means ineffective including a cylinder having a piston associated therewith, said piston being disposed to urge said upper feed bar away from the lower feed bar against the action of said spring when fluid under pressure is supplied to said cylinder and means for supplying fluid under pressure to said cylinder during said return stroke.

7. A grip feed as in claim 2 in which said upper feed bar includes a clamp, said lower feed bar including a second clamp and means for adjustably mounting said second clamp on said lower feed bar.

8. A grip feed as in claim 2 in which said upper clamping bar includes a grip, said lower clamping bar including a second grip, and means for adjustably mounting said second grip on said lower clamping bar.

9. A grip feed as in claim 2 in which said driving means includes a rack, a gear in engagement with the rack, and means for oscillating said gear to reciprocate said rack.

10. A grip feed as in claim 2 including an overload slip connection coupling said driving means and said feed bar assembly.

11. A grip feed as in claim 2 in which said driving means includes a rack, a gear in engagement with said rack and means for oscillating said gear with a force of predetermined maximum limit to reciprocate said gear.

12. A grip feed as in claim 2 including respective stops for limiting the movement of said feed bar assembly on its feed stroke and on its return stroke.

13. A grip feed as in claim 2 including a fixed stop and a movable stop for limiting the movement of said feed bar assembly in its respective feed stroke and return stroke and means for adjusting the position of the movable stop.

14. A grip feed as in claim 2 including means for supporting said frame and means for adjusting the position of said frame on said supporting means.

15. A grip feed as in claim 2 including means for initiating movement of a sheet of material toward said feed bar assembly.

16. A grip feed as in claim 2 including a pair of feed-in rolls carried by said frame, means normally urging said feed rolls toward each other and means for driving said feed rolls to advance a sheet of material toward the feed bar assembly.

17. A grip feed as in claim 2 including a pair of feed-in rolls, means for urging said feed-in rolls toward one another to grip a sheet of material, means for driving said feed-in rolls to advance said sheet and manually operable means for dendering ineffective said means for urging the feed-in rolls toward one another.

18. A grip feed as in claim 2 including support rollers for supporting a sheet of material being fed into the grip feed.

19. A grip feed as in claim 2 including bars for supporting the sheet of material being fed.

20. A grip feed as in claim 2 including bars for supporting a sheet of material being fed and a bar for preventing sagging of said sheet.

21. A grip feed as in claim 2 in which said means for rendering the clamping bar and feed bar urging means ineffective includes respective clamping bar and feed bar cylinders having respective pistons associated therewith, said pistons being disposed to raise the respective upper clamping bar and upper feed bar against the action of the associated urging means when fluid under pressure is supplied to said cylinders, a source of fluid under pressure, a first valve for connecting said source to said clamping bar cylinder and a second valve for connecting said source to said feed bar cylinder, said first valve being adapted to be actuated to supply fluid under pressure to said clamping bar cylinder during the return stroke, said second valve being adapted to be actuated to supply fluid under pressure to the feed bar cylinder during the feed stroke.

22. A grip feed as in claim 2 in which said feed bar assembly includes shock-absorbing means for bringing said feed bar assembly to rest at the end of its feed stroke and at the end of its return stroke.

References Cited in the file of this patent

UNITED STATES PATENTS

| | | |
|---|---|---|
| 1,375,889 | Baltzley | Apr. 26, 1921 |
| 1,749,505 | Pierce | Mar. 4, 1930 |
| 2,006,040 | Crane | June 25, 1935 |
| 2,250,530 | Hafecost | July 29, 1941 |
| 2,278,921 | Fischer | Apr. 7, 1942 |
| 2,379,002 | Haller | June 26, 1945 |
| 2,467,740 | Haller | Apr. 19, 1949 |
| 2,622,874 | Haller | Dec. 23, 1952 |
| 2,665,905 | Lyon | Jan. 12, 1954 |
| 2,696,380 | Adams | Dec. 7, 1954 |

U. S. DEPARTMENT OF COMMERCE
PATENT OFFICE

CERTIFICATE OF CORRECTION

Patent No. 2,825,560     Philo H. Danly et al.     March 4, 1958

It is hereby certified that error appears in the printed specification of the above numbered patent requiring correction and that the said Letters Patent should read as corrected below.

Column 10, line 55, for "dendering" read -- rendering --.

Signed and sealed this 24th day of June 1958.

(SEAL)
Attest:

KARL H. AXLINE
Attesting Officer

ROBERT C. WATSON
Commissioner of Patents